Jan. 25, 1966  J. L. COOPER  3,231,101
PALLET HANDLING MACHINE
Filed June 19, 1962  6 Sheets-Sheet 1

INVENTOR.
JIMMIE LLOYD COOPER
BY
ATTORNEYS

Jan. 25, 1966

J. L. COOPER 3,231,101

PALLET HANDLING MACHINE

Filed June 19, 1962

INVENTOR.
JIMMIE LLOYD COOPER
BY George P. Giehmer
George W. Reiber
ATTORNEYS

INVENTOR.
JIMMIE LLOYD COOPER
BY George P. Diehmer
George W. Reiber
ATTORNEYS

Jan. 25, 1966  J. L. COOPER  3,231,101
PALLET HANDLING MACHINE
Filed June 19, 1962  6 Sheets-Sheet 5
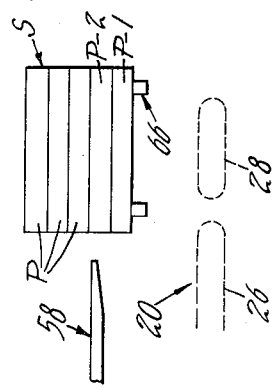
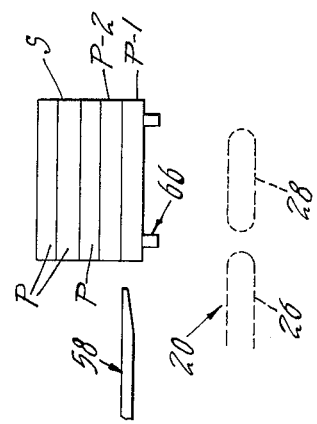
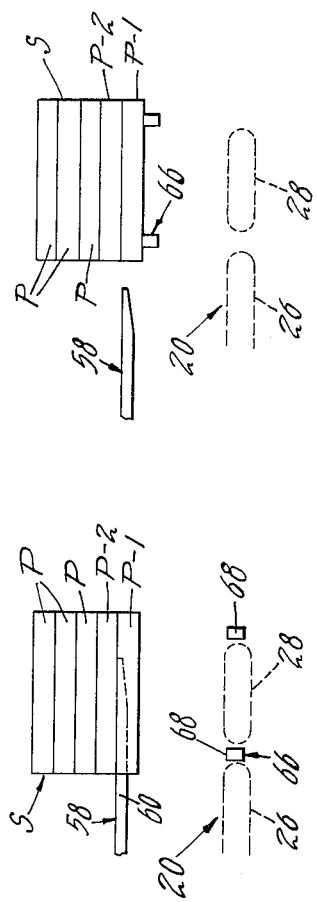
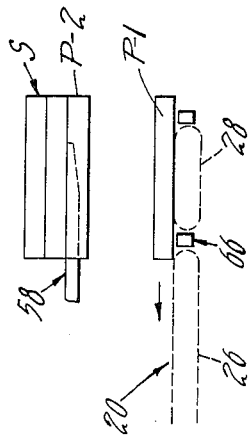
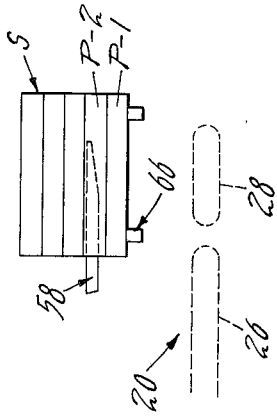
INVENTOR.
JIMMIE LLOYD COPPER
BY *George P. Niehmer*
*George W. Railer*
ATTORNEYS

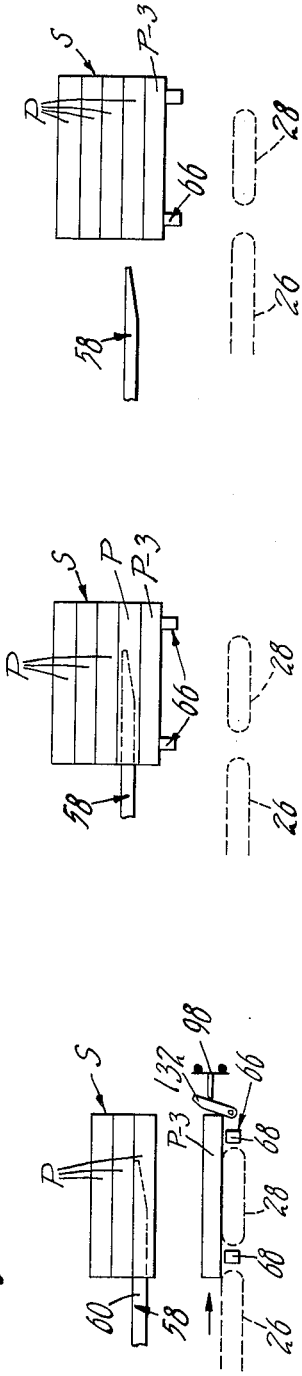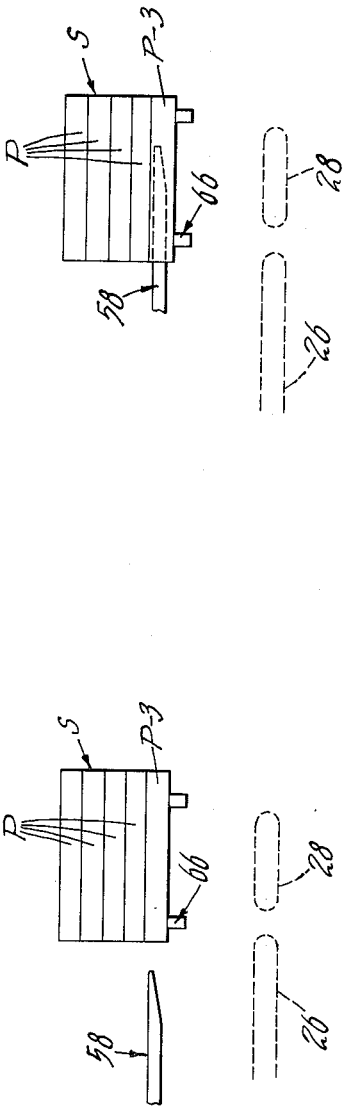

United States Patent Office 3,231,101
Patented Jan. 25, 1966

3,231,101
PALLET HANDLING MACHINE
Jimmie Lloyd Cooper, Stockton, Calif., assignor to American Can Company, New York, N.Y., a corporation of New Jersey
Filed June 19, 1962, Ser. No. 203,584
4 Claims. (Cl. 214—6)

The present invention relates to a machine which can be used to either add pallets to or to feed pallets from the bottom of a vertical stack, and has particular reference to such a device wherein a horizontally movable fork and a vertically movable fork cooperate to perform the desired stacking and unstacking operations.

The adoption of palletizing as a method of article handling has added greatly to the operating efficiencies in many industries, such as the container making and packing industries. In many instances the pallets comprise spaced top and bottom wooden decks which are separated by stringers to form a hollow structure. In order to obtain the highest efficiencies, it is desirable to handle these pallets automatically; that is, to feed the pallets automatically from a stack to the palletizing machine which loads the articles on the pallets, and to add the pallets to a stack after the articles have been unloaded from them by the depalletizing machine.

The present invention contemplates the provision of a machine of sturdy, comparatively inexpensive construction which performs these functions, the main operating parts of the machine being a horizontally movable fork which is insertable into the hollow, open core of a pallet to support the stack and a vertically movable fork which is engageable against the underside of the bottom deck of the pallet being stacked or unstacked, these forks being operated in timed cooperative sequence to maintain full support of the stack during each cycle of the machine.

An object of the invention, therefore, is the provision of a pallet handling machine which is simple and reliable in operation, and composed of a minimum number of moving parts.

Another object is the provision of a pallet handling machine which is compact in size and low in height and wherein the main frame is positioned on one side of the stack of pallets which are being handled so that the machine can in many instances be installed beneath the frame of the palletizing or depalletizing machine which it is serving, thereby minimizing the floor space requirements of the palletizing and/or depalletizing equipment.

Still another object of the invention is the provision of a machine wherein the devices which engage the pallets during the stacking and unstacking operations comprise a pair of forks, or their equivalents, which make contact with comparatively extensive interiorly extending surfaces of the pallets so that there is substantially no chance of having the pallets slip from the control of these devices should the edge portions of the pallets be damaged, as frequently is the case.

Numerous other objects and advantages of the invention will be apparent as it is better understood from the following description, which, taken in connection with the accompanying drawings, discloses a preferred embodiment thereof.

Referring to the drawings.

FIGS. 6, 7, 8, 9 and 10 are schematic views showing the successive steps of a pallet unstacking cycle of the machine; and FIGS. 11, 12, 13, 14 and 15 are schematic views, similar to FIGS. 5, 6, 7, 8 and 9, but illustrating the successive steps of a pallet stacking cycle of the machine.

Figure 1:
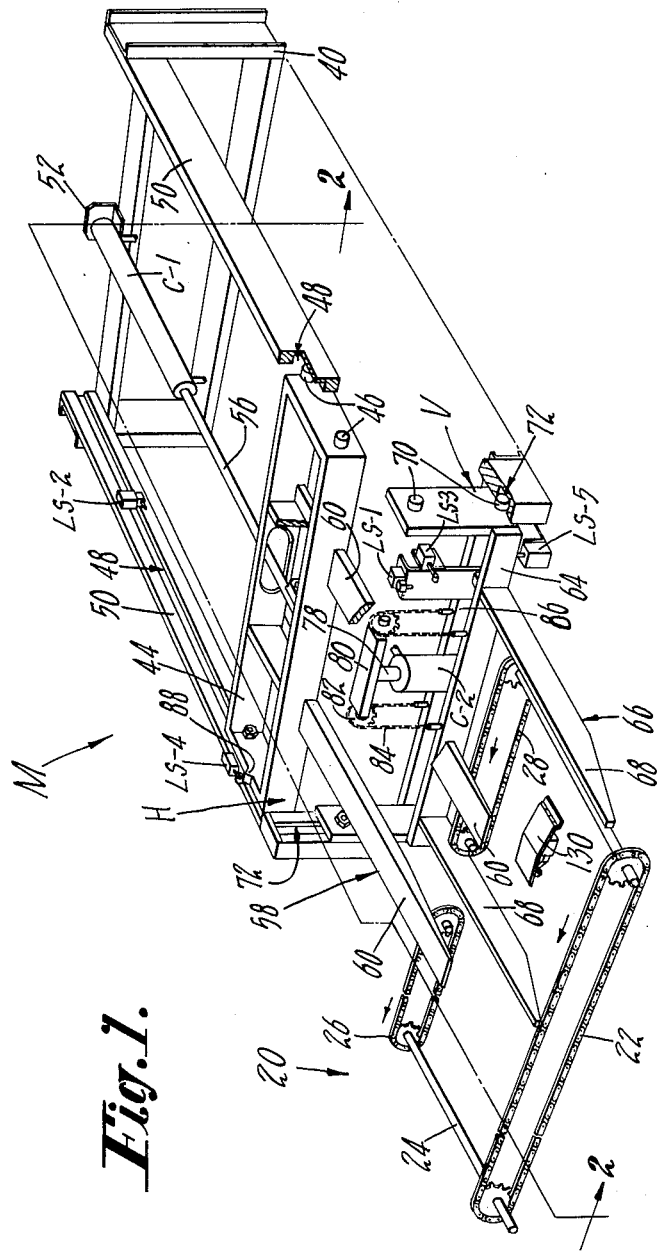
FIGURE 1 is a perspective view of a pallet handling machine embodying the principles of the instant invention.

As a preferred and exemplary embodiment of the instant invention, the drawings illustrate a pallet handling machine M which is arranged to operate as an unstacking machine which feeds pallets P individually and successively from the bottom of a vertical stack S onto a discharge runway 20, one side of which comprises an endless chain 22 which is suitably driven in the direction indicated by the arrow in FIG. 1 by a drive shaft 24 which in turn is rotated by any suitable drive mechanism such as a drive motor (not shown). The opposite side of the discharge runway 20 comprises a pair of short longitudinally spaced endless chains 26, 28 which are operatively connected to and driven from the drive shaft 24 at the same speed and in the same direction as is the chain 22.

The pallets P (see FIGS. 2 and 5) are preferably of the hollow core type and comprise an upper deck 30, composed of a plurality of deck boards 32, and a lower deck 34, composed of a plurality of deck boards 36 which are maintained in spaced and parallel relationship to the deck boards 32 by three stringers 38, the deck boards 32, 36 preferably being secured to the stringers 38 by nailing to form a sturdy rigid structure which is open at two ends.

The machine M comprises a main frame 40 (see FIG. 1) which is disposed on one side of the discharge runway 20 and has mounted on it a horizontally reciprocable fork assembly, generally designated by the letter H, which comprises a support frame 44, the end plates of which are provided with sets of rollers 46 which operate in grooved tracks 48 which are formed in upper side bars 50 of the main machine frame 40.

The horizontal fork assembly H is reciprocated by a horizontally mounted hydraulic cylinder C–1, which is mounted on a stationary bracket 52 secured to the machine frame 40. The cylinder C–1 includes a piston 54 and a piston rod 56, the front end of which is secured to the frame 44. At its front end, the horizontal fork assembly H carries a horizontally extending fork 58 which comprises a pair of spaced tines 60 which, when the assembly H is in its forward, extended, position, are disposed in spaced relationship over the discharge runway 20 and engage within the hollow core of the bottom pallet P–1 in the stack S to support the stack S. In this position, the fork 58 engages the undersurface of the upper deck 30 of the bottom pellet P–1 (see FIG. 2).

The main machine frame 40 also has mounted in it a vertically reciprocable fork assembly V which comprises a support frame 64 and a second horizontally extending fork 66 which preferably consists of a pair of spaced prongs 68 which extend transversely of the runway 20 in substantial vertical alignment with the fork 66 when the latter is in its extended position, and terminate inwardly of the chain 22.

The end plates of the frame 64 are provided with sets of rollers 70 which operate in grooved tracks 72 which are formed in the front corner standards of the main frame 40.

The vertical fork assembly V is actuated by a vertically mounted hydraulic cylinder C–2, the bottom end of which is secured to the frame 40. The hydraulic cylinder C–2 includes a piston 76 and a piston rod 78 which carries at its upper end a plate 80 on which is mounted a pair of sprockets 82 around which operate a pair of short chains 84. One end of each chain 84 is anchored to a cross-member 86 which comprises a portion of the frame 40, the other end being secured to the frame 64 of the vertical fork assembly V. Thus, when the piston 76 is moved upwardly between the tines 60 of the fork assembly H, the resultant upward movement of the ends of the chains 84 which are secured to the frame 64 causes the fork assembly V to move upwardly. When the piston 76 moves downwardly, the fork assembly V moves downwardly, under its own weight and the weight of the stack S.

In FIGURES 1 through 6 of the drawings, the various mechanical parts, the hydraulic system, and the electrical circuits of the machine M are illustrated as they appear at the start of a pallet unstacking operation, with the vertically operating fork 66 in its down position and with the horizontally operating fork 58 in its forward, stack supporting position.

Figure 2:
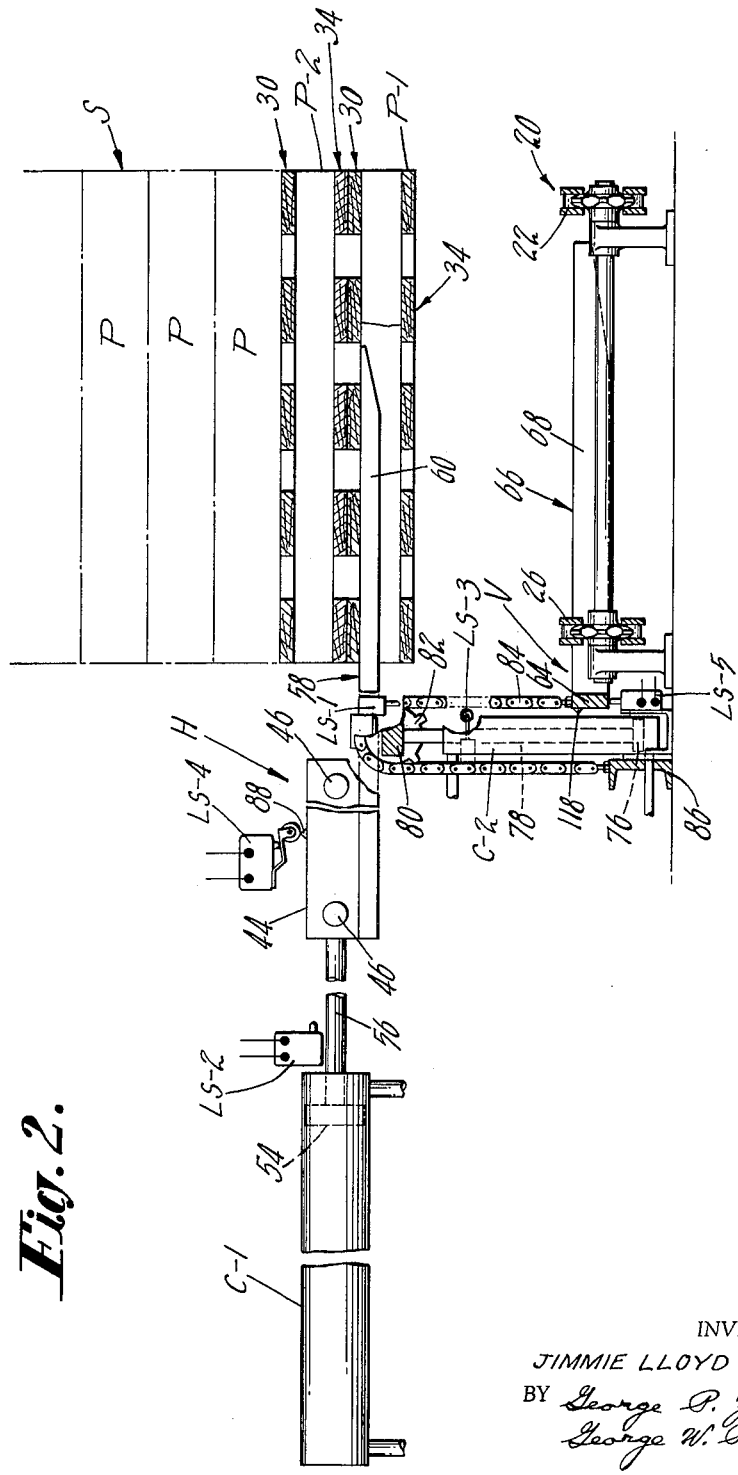
FIG. 2 is a vertical section taken substantially along the line 2—2 in FIG. 1, certain parts being omitted and other parts being broken away.

As best seen in FIGS. 1, 2 and 6, when fork 66 is in its down position, the upper surfaces of its prongs 68 are disposed below the level of the upper flights of the runway chains 22, 26, 28, one of the prongs 68 being disposed in the gap between the adjacent ends of the chains 26, 28 and the other being disposed beyond the end of the chain 28.

In this down position, the frame 64 of the fork assembly V holds the plunger of a limit switch LS–5, which is fixedly mounted on the frame 40, in depressed position, while a lug 88 on one of the end plates of the horizontal frame support 44 engages the plunger of a second limit switch LS–4, which is also fixedly mounted on the frame 40, and holds the switch LS–2 in engagement with its upper contact 89.

Figure 4:
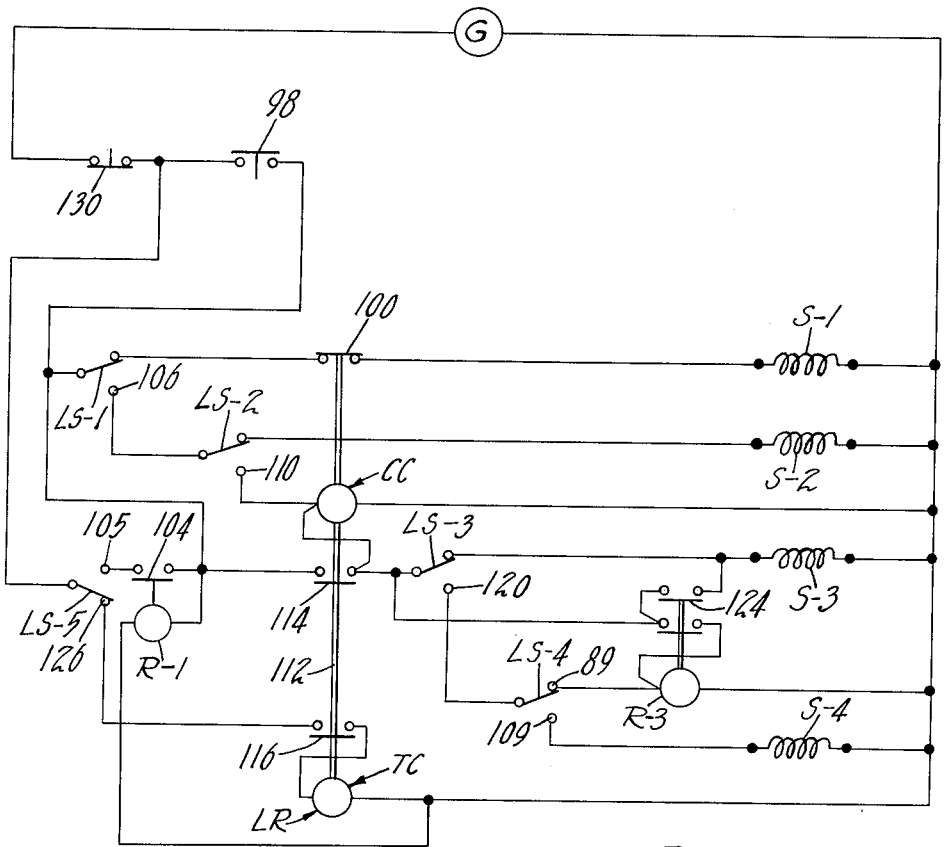
FIG. 4 is a wiring diagram of the electrical control circuits of the machine.
Figure 5:
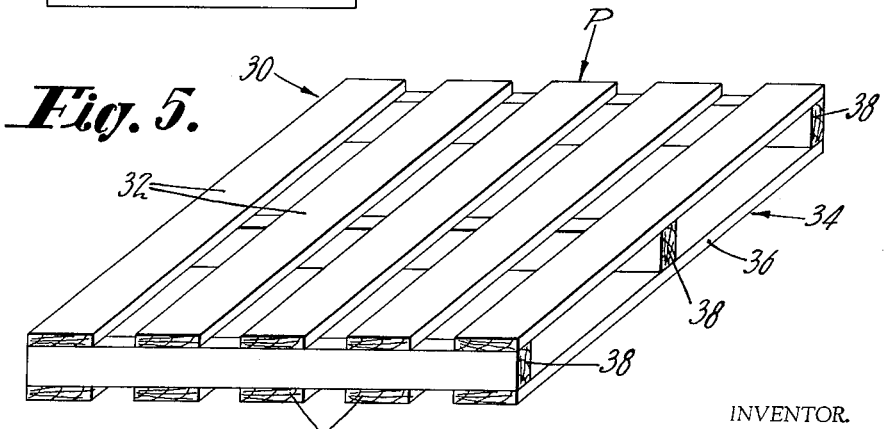
FIG. 5 is a perspective view of a pallet of a type which is capable of being handled by the instant machine.

To initiate the next pallet unloading cycle, the operator need merely momentarily close the contacts of a starter switch 98 which is incorporated in the electrical circuits shown in FIG. 4. The closing of the switch 98 results in the energizing of a solenoid S–1, via a third limit switch LS–1 and the upper, normally closed switch 100 of a latching type relay LR which includes a closing coil CC and a trip coil TC.

Figure 3:
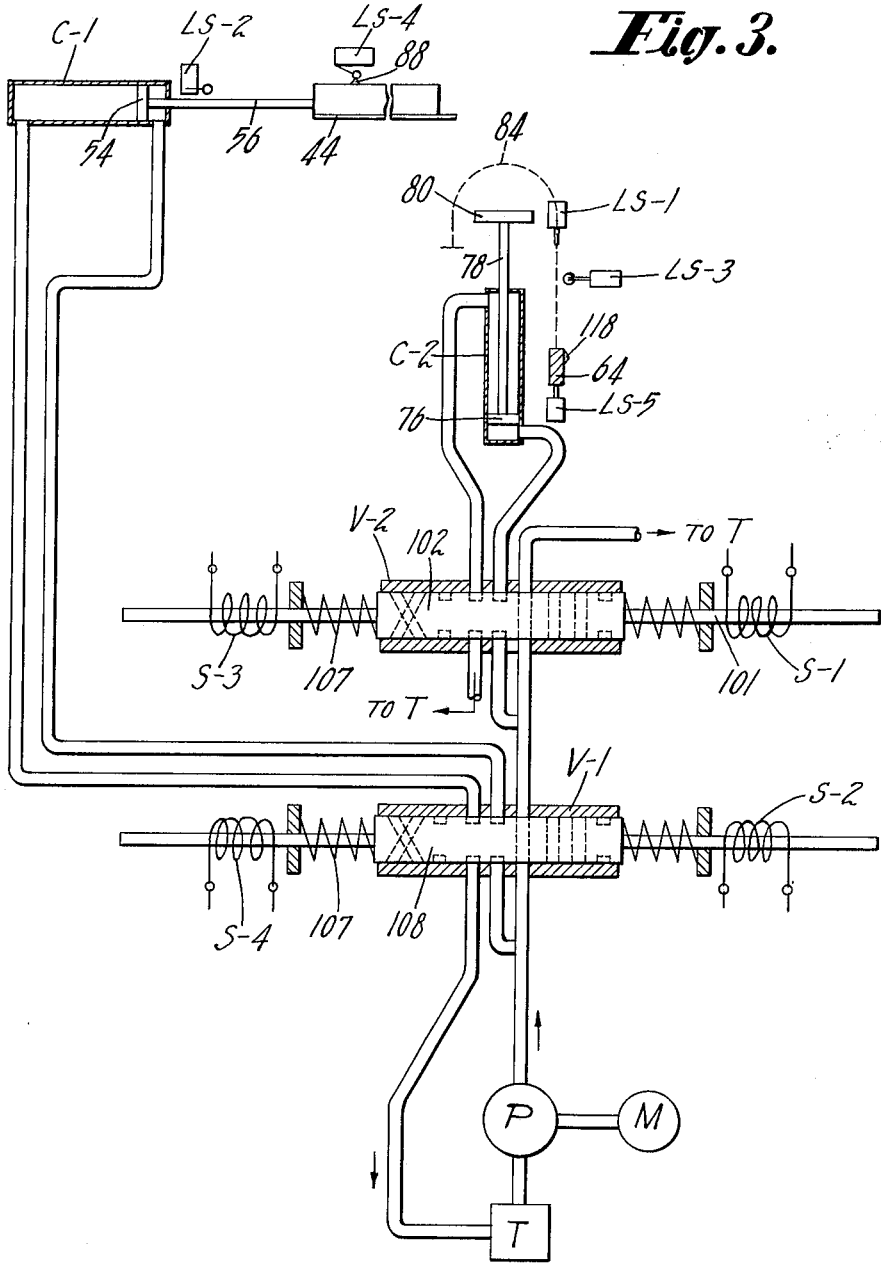
FIG. 3 is a schematic view showing the hydraulic system of the instant machine, together with the principal electrical control components associated therewith.

The core 101 of solenoid S–1 is secured to one end of the movable, three-section slide 102 of a three-position, three-port flow control valve V–2 which controls the flow of hydraulic fluid to the cylinder C–2 (see FIG. 3). Energization of the solenoid S–1 causes the slide 102 to move to the left, as viewed in FIG. 3, thus permitting the hydraulic fluid in the hydraulic system to flow from a pump P, driven by motor M, into the bottom of the cylinder C–2 and causing the piston 76, and consequently the fork assembly V and fork 66, to move upwardly, the fluid above the piston 76 flowing into a tank T which is connected to the inlet side of the pump P.

Pressing of the starter switch 98 also energizes a relay R–1, thereby closing its normally open switch 104 which is shown in the lower left-hand corner of FIG. 4. The upward movement of the fork assembly V also releases the plunger of the switch LS–5, causing this switch LS–5 to engage its upper contact 105, thereby completing a holding cicuit which includes the now-closed switch 104 and the relay R–1, thereby bypassing the starter switch 98, which may thereafter be released.

The upward movement of the vertical fork assembly V continues until its frame 64 reaches its top position, at which point it trips the limit switch LS–1, and moves it into engagement with its contact 106, thereby deenergizing the solenoid S–1 and permitting the valve slide 102 to be returned to its centralized position by a spring 107, in which position the slide 102 cuts off the flow of fluid to the cylinder C–2 and stops its upward movement.

During this upward movement of the fork assembly V, the prongs 68 of the fork 66 engage against the bottom surface of the lower deck 34 of the lowermost pallet P–1 in the stack S and lift the pallet P–1 and the stack S a short distance, somewhere on the order of about one-half an inch, so that the bottom surface of the upper deck 30 of the lowermost pallet P–1 is lifted clear of the tines 60 of the horizontally movable fork 58 so that support of the stack S is transferred from the fork 58 to the fork 66. At this poinnt, the upward movement of the fork 66 ceases.

The tripping of limit switch LS–1, in addition to deenergizing solenoid S–1, also results in the closing of a circuit which includes switch LS–1, a limit switch LS–2, and a solenoid S–2, the core of which is secured to one end of a second three-position, three-port flow control valve V–1 which controls the cylinder C–1. Energization of solenoid S–2 causes the three-section slide 108 of valve V–1 to move to the left, as viewed in FIG. 3, thus connecting pump P to the right-hand end of cylinder C–1 and causing the piston 54 to move to the left, thus moving the fork assembly H to the left and retracting the horizontally movable fork 58 from the core of the lowermost pallet P–1 to the position shown in FIG. 7.

Withdrawal of the fork 58 continues until it is clear of pallet P–1, at which time the frame 44 trips the plunger of the limit switch LS–2, thereby deenergizing solenoid S–2 and stopping the flow of hydraulic fluid to the cylinder C–1.

It will be noted that at the start of the backward movement of the frame 44, its lug 88 disengages itself from the plunger of limit switch LS–4, thus permitting the switch LS–4 to return to its normal position where it engages a contact 109.

Tripping of the switch LS–2 causes it to move into engagement with a contact 110, thus establishing a circuit through the closing coil CC of latching relay LR, thus moving its armature 112 upwardly and opening the switch 100 and closing switches 114, 116. It also establishes a second circuit which includes a switch LS–3 and a third solenoid S–3 which is disposed on the side of the flow control valve V–2 opposite to solenoid S–1.

Energizing of the solenoid S–3 moves the valve slide 102 to the right, connecting the upper end of the cylinder C–2 with the pump P, thus resulting in downward movement of the vertically movable fork 66 and a consequent lowering of the stack S, which continues until the stack S reaches its intermediate position wherein it has been lowered the thickness of one pallet, thus bringing the open core of the next to the lowermost pallet P–2 in stack S into horizontal alignment with the horizontally movable fork 58.

At this point, a lug 118 carried by the vertical frame 64 trips the trip arm of the limit switch LS–3, thus deenergizing solenoid S–3 and stopping the downward movement of the fork 66. The relative positions of the forks 58, 66 at this time is shown in FIG. 8. It will be noted that the trip arm of switch LS–3 is also tripped by lug 118 during the upward stroke of frame 64, but this does not affect the operation of the machine M since no circuit is closed thereby.

The tripping of the switch LS–3 by the lug 118 moves the switch LS–3 into engagement with a contact 120 which closes a circuit which includes switch LS–4 and a fourth solenoid S–4, which is associated with valve V–1 and which moves the valve slide 108 to the right, thus connecting the left-hand side of the cylinder C–1 with pump P and causing the fork assembly H to move forwardly and insert the fork 58 into the open core of the next to the lowermost pallet P–2, the top deck 30 of this pallet being spaced slightly above the top surfaces of the fork 58 to permit easy insertion of the fork.

At the end of this forward stroke, the lug 88 on frame 44 depresses the plunger of limit switch LS–4, thereby moving switch LS–4 from contact 109 to contact 89. This breaks the circuit to the solenoid S–4, and stops the forward movement of the fork 58. The position of the forks 58, 66 at the end of this forward stroke of the fork 58 is shown in FIG. 9, the pallet stack S still being supported by the fork 66.

The actuation of switch LS–4 into engagement with contact 89 creates a circuit which energizes relay R–3 and closes its double pole switch 124. This establishes a circuit through switch 124 which bypasses switches LS-3 and LS-4 and holds relay R-3 energized, and simultaneously establishes a second bypass circuit through switch 124 which re-energizes solenoid S-3, causing the vertically movable fork 66 to resume its downward movement. During the first portion of this downward movement, the next to the lowermost pallet P-2 is lowered onto the fork 58 with the result that support of the stack S is transferred back to the fork 58. The balance of the downward movement of the fork 66 results in a lowering of the lowermost pallet P-1 onto the discharge runway 20 (see FIG. 10), which moves pallet P-1 laterally from beneath the stack S and feeds it to any suitable place of deposit, which usually is a palletizing machine.

The downward movement of the fork 66 is stopped when the frame 64 trips the limit switch LS-5, thereby moving it into engagement with the contact 126, thus breaking the holding circuit which has theretofore kept the relay R-1 energized. This opens switch 104 and breaks the main holding circuit. Tripping of switch LS-5 simultaneously establishes a circuit which energizes the trip coil TC of latching relay LR, thus resetting the switches 100, 114, 116 for the next cycle of operation.

The relative positions of the forks 58, 66 at the end of this just described unstacking cycle is shown in FIG. 10, the upper surface of the fork 66 being below the level of the runway 20 at this time to permit discharge of the just-lowered pallet P-1 by the runway chains 22, 26, 28 without interference from the fork 66.

It is desirable to locate a stop switch 130 (see FIGS. 1 and 4) in the runway 20 below the stack S. This switch 130, which is held in depressed position when engaged by a pallet P, prevents the operation of the machine M so long as such pallet remains on the runway 20 below the stack S and thus effectively prevents jams. Other, emergency stop switches may be similarly incorporated into the circuit in series with switch 130. The opening of any such switch will merely temporarily suspend operation of the machine M, its operation being resumed upon the closing of such switch.

It is obvious that the machine M is also adapted to add pallets P to the bottom of stack S with only minor adjustments of its electrical circuits, which are well within the skill of the ordinary electrician and are not shown herein for the sake of brevity. The sequence of steps of a pallet stacking operation is, however, illustrated in FIGS. 11 through 15, inclusive, and will now be described briefly with reference to those figures.

The incoming pallet P-3 is fed to the machine by the runway chains 22, 26, 28, the direction of operation of which is reversed, the stop switch 130 being omitted. When the pallet P-3 reaches stacking position (see FIG. 11), it moves a stop arm 132, thereby closing the starter switch of the machine to automatically initiate the stacking cycle, which begins with the energizing of solenoid S-1 to move the fork 66 upwardly to lift the pallet P-3 toward the bottom of stack S. This upward movement of fork 66 continues until it reaches its intermediate position, as shown in FIG. 12, at which time the pallet P-3 has engaged against the bottom of stack S and raised it clear of fork 58. When the fork 66 reaches this intermediate position, the switch LS-3 is tripped, by lug 118, the circuitry of the machine being such that tripping of switch LS-3 deenergizes solenoid S-1 and energizes solenoid S-2, thereby resulting in retraction of the fork 58 from the stack S, as seen in FIG. 13.

Retraction of fork 58 is stopped by actuation of switch LS-2 by frame 44. This results in deenergization of solenoid S-2 and reenergization of solenoid S-1, thereby effecting resumption of the upward motion of fork 66, which now supports the stack S. This motion continues until the stack S is raised the thickness of one pallet P, to the position shown in FIG. 14.

When fork 66 reaches this position, the switch LS-1 is tripped by frame 64, causing deenergization of solenoid S-1 and thus halting the upward movement of fork 66, and simultaneously causing energization of solenoid S-4 to effect forward movement of fork assembly H and the insertion of the fork 58 into the open core of the newly stacked pallet P-3, as seen in FIG. 15.

At the end of the forward stroke of the fork 58, the switch LS-4 is actuated by lug 88, thus deenergizing solenoid S-4 and simultaneously energizing solenoid S-3 to effect lowering of the fork 58 to deposit the stack S onto the fork 66. The downward movement of the fork 58 continues uninterruptedly past its intermediate position and until it reaches the bottom of its stroke, at which time switch LS-5 is actuated by frame 64, deenergizing solenoid S-3 and re-setting the machine M for its next stacking operation.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A pallet handling machine comprising in combination, a horizontally movable fork member engageable within the core of the lowermost pallet in a vertical stack of pallets to support said stack, a vertically movable fork member disposed beneath said stack, said vertically movable member having a down position wherein it is disposed in spaced vertical relationship to said stack for receiving an incoming pallet to be added to said stack, means for moving said vertically movable member upwardly to bring an incoming pallet disposed thereon into engagement against the bottom of said lowermost pallet in said stack, means for retracting said horizontally movable member from said lowermost pallet after said incoming pallet is brought into engagement with said lowermost pallet, means for lifting said vertically movable member a distance substantially equal to the thickness of a pallet to raise said incoming pallet into horizontal alignment with said horizontally movable member, means for advancing said horizontally movable member to its forwardly extended position to insert it into the core of said incoming pallet when it is in alignment therewith, means for moving said vertically movable member to its down position to lower said incoming pallet and said stack onto said horizontally movable member and runway means for conveying an incoming pallet to a position wherein it is disposed above said vertically movable member when the latter is in its down position, said runway means having a feed surface which is disposed in substantial horizontal alignment with the upper surface of said vertically movable member when the latter is in its said down position, and said runway means having a recess which is positioned to receive said vertically movable member when it is in said down position.

2. A pallet handling machine comprising in combination, a horizontally movable fork member engageable within the core of the lowermost pallet in a vertical stack of pallets to support said stack, a vertically movable fork member disposed beneath said stack in vertical alignment therewith, said vertically movable member having a down position wherein it is disposed in spaced relationship to said stack, means for moving said vertically movable member upwardly into engagement with the bottom of the said lowermost pallet in said stack, means for retracting said horizontally movable member from said lowermost pallet after said vertically movable member is moved upwardly into engagement with said lowermost pallet, means for lowering said vertically movable member a distance equal to the thickness of a pallet after said horizontally movable member is retracted, means for advancing said horizontally movable member to insert it into the core of the next to the lowermost pallet in said stack, means for lowering said vertically movable member to its down position to separate said lowermost pallet from said stack and discharge runway means for receiving said lowermost pallet from said vertically movable member when the latter is in its down position, said runway means having a discharge surface which is disposed in substantial horizontal alignment with the upper surface of said vertically movable member when it is in said down position, and said runway means having a recess which is positioned to receive said vertically movable member when it is in said down position.

3. The machine of claim 1 wherein said runway means comprises a first conveyor chain on one side thereof, and a pair of conveyor chains on the other side thereof, said pair of chains being disposed in spaced longitudinal alignment to define said runway recess and being disposed in parallel relation to said first chain.

4. The machine of claim 2 wherein said runway means comprises a first conveyor chain on one side thereof, and a pair of conveyor chains on the other side thereof, said pair of chains being disposed in spaced longitudinal alignment to define said runway recess and being disposed in parallel relation to said first chain.

References Cited by the Examiner

UNITED STATES PATENTS

| | | | |
|---|---|---|---|
| 2,639,050 | 5/1953 | Hoffman | 214—310 |
| 2,792,950 | 5/1957 | Fenton et al. | 214—6.2 |
| 2,906,434 | 9/1959 | Goodman | 221—297 |
| 3,003,661 | 10/1961 | McGrath | 221—297 |
| 3,037,645 | 6/1962 | Simpkins | 214—6.2 |
| 3,038,615 | 6/1962 | Roth | 214—6.2 |
| 3,053,402 | 9/1962 | Russell. | |
| 3,055,514 | 9/1962 | Dale et al. | 214—6.2 |
| 3,078,009 | 2/1963 | Irish | 221—297 |

HUGO O. SCHULZ, *Primary Examiner.*

MORRIS TEMIN, *Examiner.*